United States Patent [19]
Malizia

[11] Patent Number: 5,816,545
[45] Date of Patent: Oct. 6, 1998

[54] STAND HAVING CROSSED LEGS WITH PROGRAMMABLE OPENING ANGLE

[75] Inventor: Mario Malizia, Castelfidardo, Italy

[73] Assignee: Tam-S.R.L., Recanati, Italy

[21] Appl. No.: 807,705

[22] Filed: Feb. 28, 1997

[30] Foreign Application Priority Data

Aug. 9, 1996 [IT] Italy ................................ AN960024 U

[51] Int. Cl.⁶ .................................................. F16M 11/32
[52] U.S. Cl. ........................ 248/164; 108/118; 211/195; 948/257; 403/93
[58] Field of Search ..................................... 248/164, 166, 248/431, 432, 163.1, 158; 211/149, 182, 195; 108/90, 93, 118, 119; 84/376 A, 387 A, DIG. 3; 403/91, 92, 93; 984/257, 344, DIG. 1

[56] References Cited

U.S. PATENT DOCUMENTS

| | | | |
|---|---|---|---|
| 4,321,874 | 3/1982 | Cenna, III | 948/257 X |
| 4,763,864 | 8/1988 | Danner | 948/257 X |
| 4,917,341 | 4/1990 | Pirchio | 248/164 |
| 5,358,204 | 10/1994 | Terada | 248/164 |
| 5,467,953 | 11/1995 | Malizia | 248/164 X |

*Primary Examiner*—Ramon O. Ramirez
*Assistant Examiner*—Long Dinh Phan
*Attorney, Agent, or Firm*—Beveridge, DeGrandi, Weilacher & Young, LLP

[57] ABSTRACT

The present invention is for an improved stand (2) typically of the music variety. The improvements consist of a stabilizing cam (10) and a compact, centrally located, adjustable position memory element (16). The stabilizing cam (10) may be used in a variety of structures to micro adjust the level of the stand (2) to provide better support and stability. The adjustable position memory element (16) may be used on a variety of devices as well including an articulable support stand such that the support stand can be returned upon reuse to a preselected position from a plurality of preselected available positions.

4 Claims, 2 Drawing Sheets

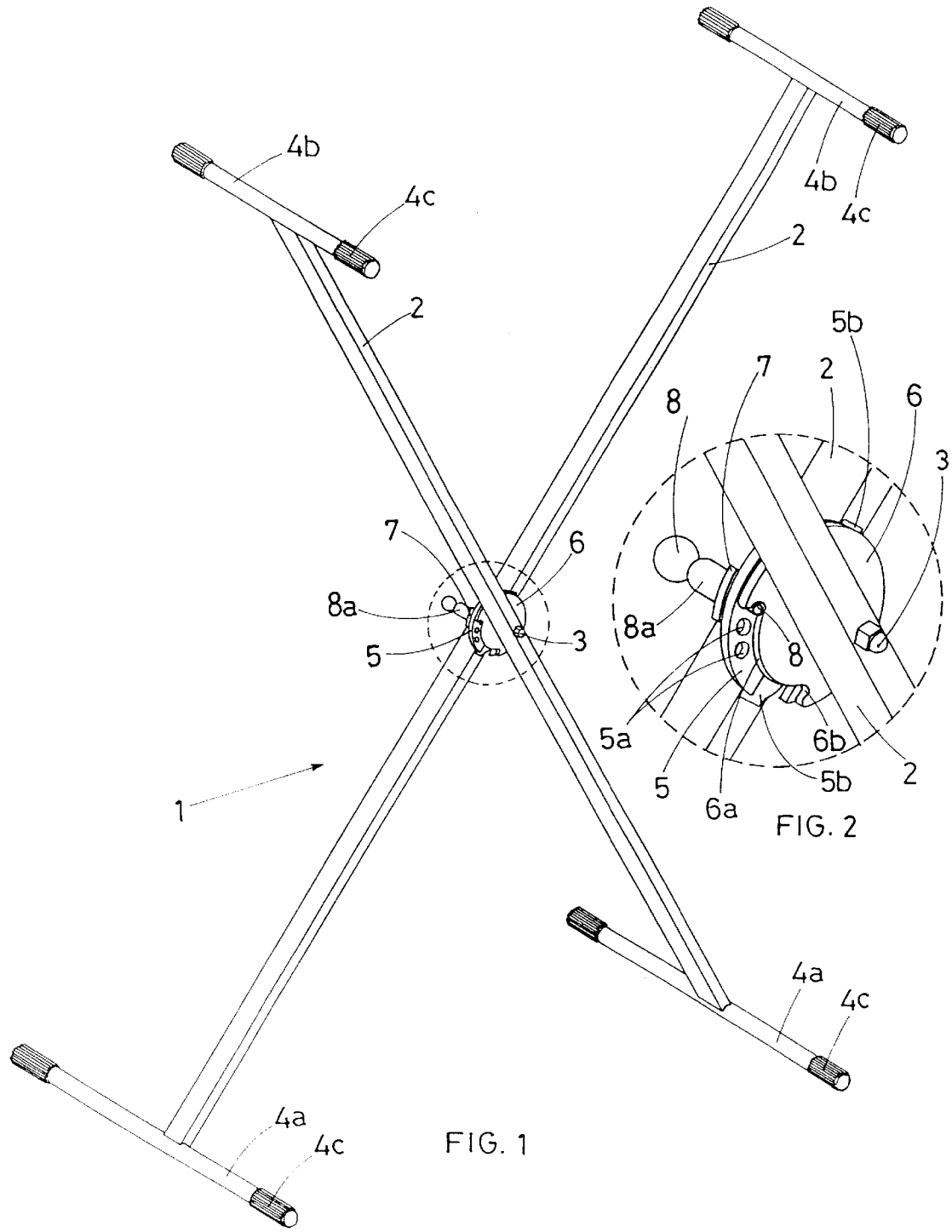

STAND HAVING CROSSED LEGS WITH PROGRAMMABLE OPENING ANGLE

This invention is for a stand having crossed legs with a programmable opening angle, designed to support musical keyboards, amplifiers, computers or other items.

There are other examples of folding metal stands with "X" shaped crossed legs produced with prior technology. These items are considered to be extremely practical since not only are they extremely sturdy but can also be folded down for transport or storage. In particular, folding the stand is possible thanks to the fact that the legs of existing stands rotate with respect to each other around a common horizontal pivoting axis, parallel and closely positioned against each other.

Moreover, these prior stands are provided with a special device to regulate the opening angle of the legs and consequently the height from the floor of the supported item.

For this purpose a traditional stand is in fact fitted with two sheet plate disks, welded respectively on each of the two legs at the centre line and coaxially to the horizontal pivoting pin around which the two legs are free to rotate idly.

One of said disks is provided with a series of holes positioned at regular intervals along a section of the edge of the circumference while the external surface of the other disk is provided with a horizontal pin subject constantly to the force of a spring that pushes it against the other disk.

It follows that since said force is far from the centre of a value equal to the radius of the circumference along which the above holes are distributed, it will tend to fit spontaneously into one of the holes on the other disk, so as to create a connection between the two legs of the stand.

It is evident that each time a conventional stand is placed into position, it is necessary to open the legs to the required angle, pull back the pin fitted to one of the above disks—overcoming the force of the opposing spring—and then allow it to move forward freely when its pointed end is perfectly aligned with the hole on the other disk of the device at the required opening position of the stand.

It also follows that to shut a stand of this kind, it is necessary to remove the pin from the housing hole—again overcoming the force of the opposing spring—and holding it back until the legs have rotated completely. Despite the fact that these stands are undoubtedly very practical, the applicant of this patent has designed a new version which is even more satisfactory from a technical and practical point of view.

More precisely, the stand according to the invention is provided with a new device for regulating the opening angle of the legs which simplifies the operation, especially for those who have to open and close the stand repeatedly.

In fact, with the previous stands, the opening must be regulated each and every time the stand is opened; obviously, in order to facilitate the operation, the user can try to remember into which hole on the metal disk the pin must be fitted.

The particular feature of the new stand according to the invention is that once the opening angle of the legs has been set, at the required height from the floor, the setting remains unaltered even if the stand is shut.

This is clearly an enormous practical advantage since every time the stand is reopened, the stand automatically returns to the same opening angle set initially, without any further action by the user.

To achieve this, the device fitted to the legs of the stand on which a specific opening angle can be set, was redesigned.

It in fact no longer consists of only two disks applied to the legs of the stand, one provided with the semicircular series of holes and the other provided with the pin subject to the force of the spring; the device now consists of three different components in that in addition to the two disks applied to the legs of the stand, the same is now provided with a vane that horizontally supports the fixing pin with return spring, and which is hinged to the horizontal pin to which the legs of the stand are hinged.

In particular the three components are positioned so that the disk provided with the series of equally spaced holes is positioned between the above rotating vane and the second disk, which is in turn provided with a groove along its edge terminating with two concave ends.

Once the pin, supported by the above vane, fits into one of the holes on the disk with holes, its tip projects from the other side of the disk and is housed firmly, once the legs have been completely opened, into the concave end of the groove on the perimeter edge of the other disk.

In particular, the length of the groove along the edge of this second disk is approximately equal to the distance covered by the series of evenly spaced holes on the disk, so that when the stand is shut, the series of holes on the intermediate disk are between the two hollow ends of the groove on the outer disk.

It follows that in the stand according to the invention, the legs open into position when the pointed tip of the pin supported by the revolving vane, fits into the relevant hollow on the grooved edge of the outer disk.

Moreover, the particular presence and positioning of the groove on the edge of the second disk ensures that the legs of the stand can be shut without removing the pin from the relevant hole on the middle disk.

In fact, when the legs of the stand in question are shut, the pointed end of the pin which projects from the disk with holes does not interfere with the other disk in that it slides along the curved groove provided for this purpose along its edge.

The fact that when the stand is shut, the fixing pin is not removed from the relevant preset hole on the disk with holes, ensures that when the stand is reopened, the legs open into exactly the same position.

For major clarity the description according to the invention continues with reference to the enclosed drawings which are intended for purposes of illustration and not in a limiting sense, where:

FIG. 1 is an axonometric view of the stand according to the invention;

FIG. 2 is an enlarged view of a portion of FIG. 1 showing the articulation joint of the stand legs;

Figure 3:
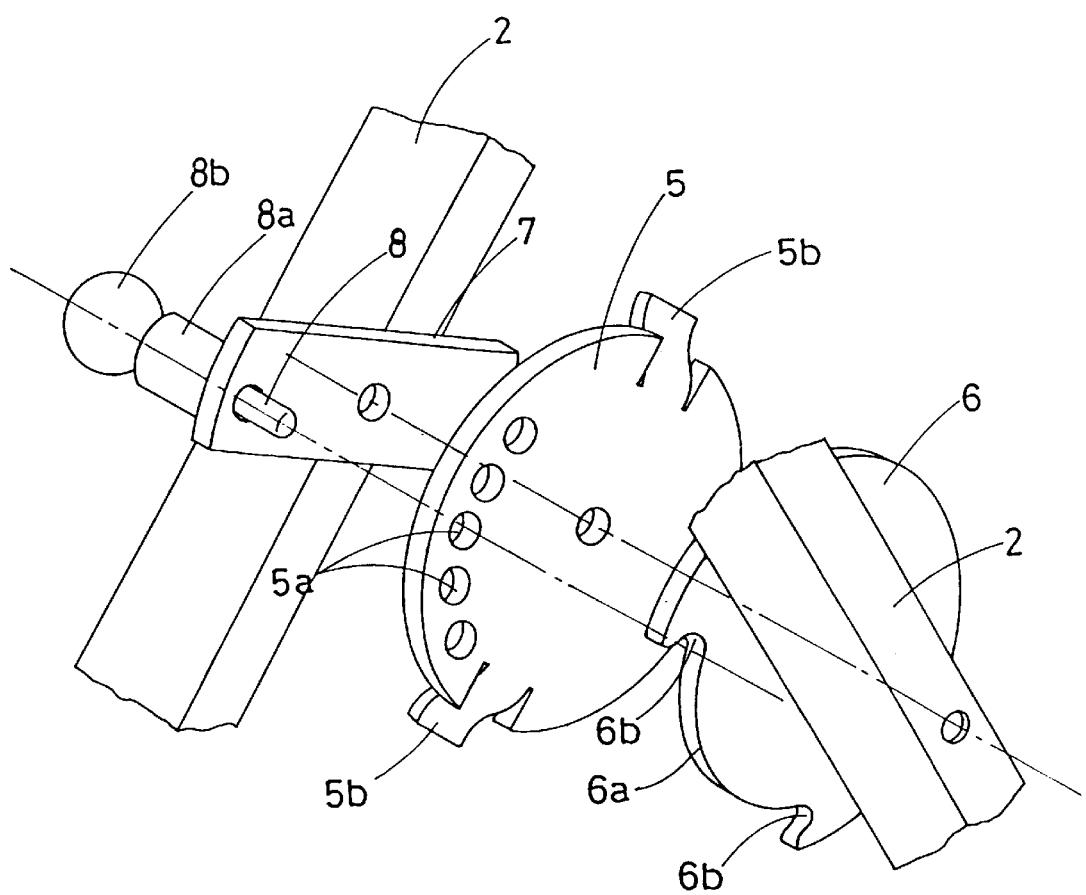
FIG. 3 is similar to FIG. 2 but with an exploded view of the different components.

With reference to the enclosed figures, the stand according to the invention (1) is of a type consisting of two metal section bars (2) acting as legs, connected and hinged at the centre by means of a horizontal pin (3).

Each of the two legs (2) is joined to the base and at the top to two identical transverse bars (4a and 4b) at whose ends rubber couplings (4c) are fitted; said bars (4a and 4b) being designed to act respectively as stabilising feet and supporting arms for the item supported.

Disks (5 and 6), which are perfectly centered with respect to pin 3, are welded on the internal side of the two metal section bars (2); the first disk (5) being provided with a series of equally spaced through holes (5a) and the other disk (6) being provided, in a corresponding position, with a groove (6a) along its perimeter edge and terminating at the end with two identical hollows an enlarged view of a portion (6b).

A vane or rod (7) is provided on the exterior of the disk with holes (5), on the side opposite to that on which the disk with grooves (6) lies; the vane (7), which is hinged to the above horizontal pin (3), supports a horizontal locking-pin (8) fitted into a short housing and guiding coupling (8a), where a spring which tends to constantly push the locking-pin (8) towards the disk with holes (5), is also housed.

Thanks to the spring therefore, the locking-pin (8) tends to spontaneously enter and remain in one of the holes made in the disk with holes (5)

The locking-pin (8) terminates externally with a holding knob (8b) by means of which it provides the necessary backward traction, when required, to remove the locking-pin (8) from its hole (5a) on disk (5).

In particular, the knob (8b) can be used successfully when it is necessary to change the opening angle of the legs of the stand in question.

In this case, it is necessary simply to remove the locking-pin (8) from one of the holes (5a) of disk (5), and then rotate the vane (7) so as to align the locking-pin (8) with another hole (5a); at this point the traction on the knob (8b) is released so that the spring automatically leads the tip of the locking-pin (8) into the new hole.

With particular reference to FIG. 2, it should be noted that the end of said pin (8) projects through to the other side of the holes (5a) of disk (5); only in this way can it in fact interfere with the hollows (6b) of the groove (6a) on disk (6) so as to determine the end of the opening stroke of the legs (2) of the stand according to the invention (1).

The number (5b) in FIG. 3 represents two diametrically opposed lugs at which the disk with holes (5) is welded to the interior of one of the legs (2).

I claim:

1. A programmable stand comprising:

two legs, a horizontal pin pivotally connecting said two legs, a first disk centered about said horizontal pin and attached to one of said two legs, said first disk having a plurality of spaced holes, a second disk axially connected to said horizontal pin, said second disk having a groove with sufficient length to span a length of said spaced holes of said first disk and two hooks, one of said hooks is at one end of said groove and the other of said hooks is at another end of said groove, a rod pivotally connected to said horizontal pin on a side of said first disk opposite said second disk, said rod having a hole therethrough at one end, and a locking-pin passing through the hole of said rod and one of said plurality of spaced holes of said first disk to engage said second disk.

2. The programmable stand according to claim 1, further comprising:

a spring connected to said locking-pin to provide a force to engage said locking-pin with one of said plurality of spaced holes of said first disk.

3. The programmable stand according to claim 1 wherein said two legs are each connected at a longitudinal center point with said horizontal pin.

4. The programmable stand according to claim 1, wherein said plurality of spaced holes of said first disk are along a perimeter of said first disk, and said groove of said second disk is formed along a portion of a perimeter of said second disk.

* * * * *

UNITED STATES PATENT AND TRADEMARK OFFICE
CERTIFICATE OF CORRECTION

PATENT NO. : 5,816,545
DATED : October 6, 1999
INVENTOR(S) : Mario Malizia

It is certified that error appears in the above-indentified patent and that said Letters Patent is hereby corrected as shown below:

On the title page item,
  [57] Abstract

This invention concerns a folding stand having by a pair of "X" shaped crossed legs having a device provided between the same on which the opening angle of the legs can be set and maintained even when the stand is next opened and closed.

Signed and Sealed this

Twentieth Day of June, 2000

*Attest:*

*Attesting Officer*

Q. TODD DICKINSON

*Director of Patents and Trademarks*